United States Patent
Mantel

(10) Patent No.: US 6,277,171 B1
(45) Date of Patent: Aug. 21, 2001

(54) METHOD OF REDUCING THE IRON CONTENT OF STEEL SLAG

(75) Inventor: Dirk Guustaaf Mantel, Strathavon (ZA)

(73) Assignee: Ipcor N.V., Curacao (AN)

( * ) Notice: Subject to any disclaimer, the term of this patent is extended or adjusted under 35 U.S.C. 154(b) by 0 days.

(21) Appl. No.: 09/000,438

(22) PCT Filed: Jul. 30, 1996

(86) PCT No.: PCT/NL96/00308

§ 371 Date: Jul. 10, 1998

§ 102(e) Date: Jul. 10, 1998

(87) PCT Pub. No.: WO97/05289

PCT Pub. Date: Feb. 13, 1997

(30) Foreign Application Priority Data

Jul. 31, 1995 (ZA) ...................................... 956367

(51) Int. Cl.⁷ ............................. C21B 11/00; C21B 15/00
(52) U.S. Cl. ................................. 75/453; 75/448; 75/503; 423/148
(58) Field of Search ............................ 75/433, 434, 453, 75/444, 447, 448, 503; 423/148

(56) References Cited

U.S. PATENT DOCUMENTS

| 3,836,356 | 9/1974 | Irani . |
| 4,001,011 | 1/1977 | Agarwal et al. . |
| 4,174,961 | * 11/1979 | Wolfs et al. ............................. 75/434 |
| 5,292,247 | * 3/1994 | Bauer ...................................... 432/58 |

FOREIGN PATENT DOCUMENTS

| 0 605 378 | 7/1994 | (EP) . |
| 1019653 | 1/1953 | (FR) . |
| 2 172 206 | 9/1973 | (FR) . |
| 2491496 | 4/1982 | (FR) . |
| 2 610 616 | 8/1988 | (FR) . |
| 368312 | 2/1932 | (GB) . |
| 75 130 | 1/1977 | (LU) . |
| 7712077 | 5/1979 | (NL) . |

OTHER PUBLICATIONS

*Chemical Abstracts*, "Method and Apparatus for Processing Slag Melts", p. 359, 1987.
International Search Report for PCT/NL96/00308.

* cited by examiner

*Primary Examiner*—Steven Bos
(74) *Attorney, Agent, or Firm*—Merchant & Gould P.C.

(57) ABSTRACT

A method of reducing the iron content of starting material containing calcium, silicon and oxygen, and iron in the form of a ferrite and/or oxide, for example a steel slag, includes the steps of heating the starting material to a temperature of at least 800° C. and preferably between 900° C. and 1150° C. inclusive, in the presence of a reductant such as carbon monoxide and in the presence of a siliceous material with which non-ferrous oxides released during the reduction form high melting point compounds, to produce a magnetic form of iron, and removing at least some of the magnetic form of iron to produce a product, which may be used as a raw material in the cement industry.

14 Claims, 1 Drawing Sheet

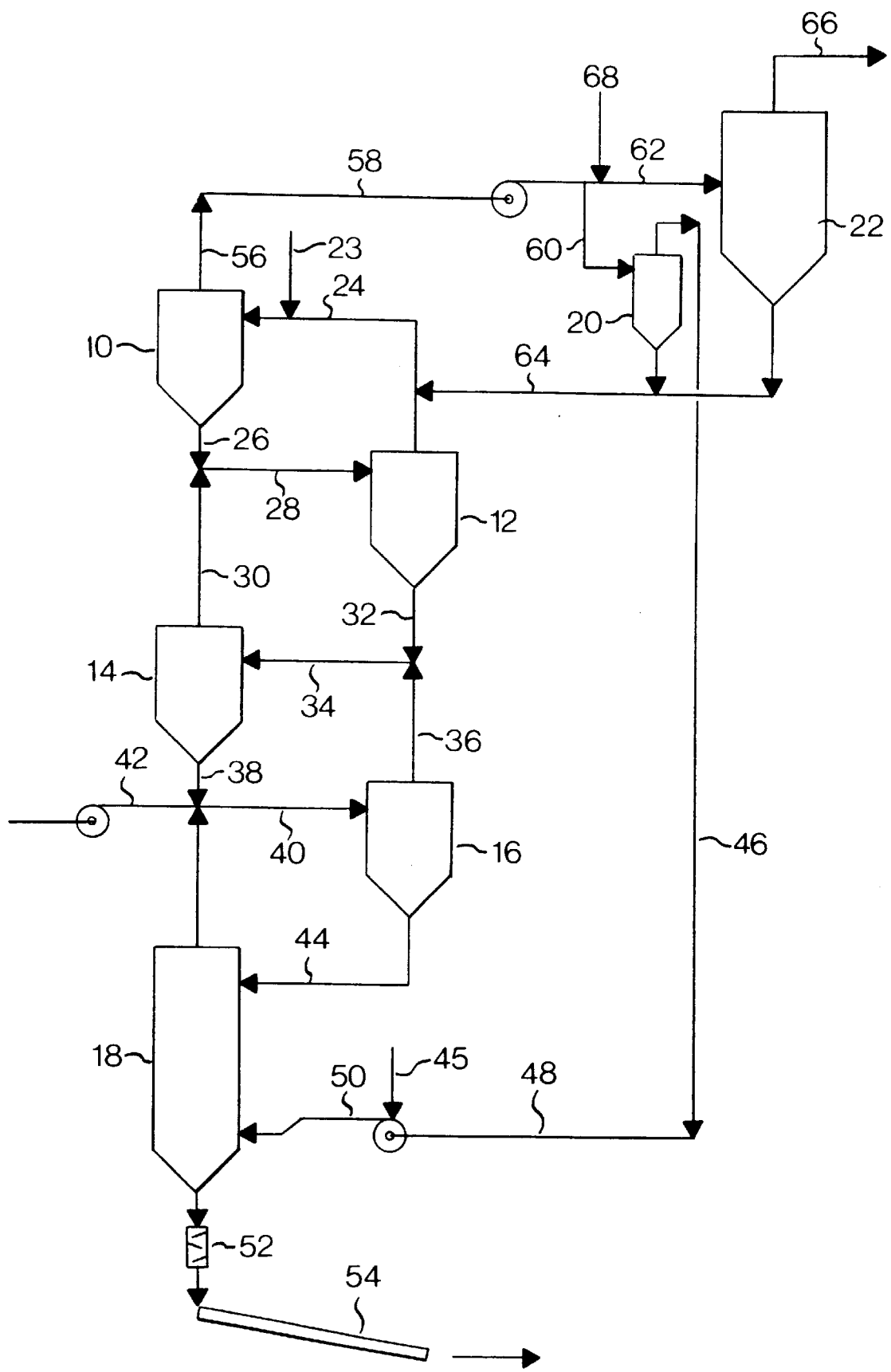

METHOD OF REDUCING THE IRON CONTENT OF STEEL SLAG

BACKGROUND OF THE INVENTION

This invention relates to a method of reducing the iron content of a material containing calcium, silicon and oxygen, and iron in the form of a ferrite and/or oxide, and particularly to the treatment of slag, particularly to make it suitable for use as a raw material for the manufacture of a hydraulic cement.

In the manufacture of steel, slag is produced which is a waste product and which is generally characterised by the presence of significant percentages of calcium oxide, silica and iron in the form of iron oxides or iron ferrites. The actual composition of these slags depends on the raw materials used in the process and type of furnace employed. Expressing the iron as $Fe_2O_3$, as is common in the cement industry, a typical range of the concentration of the above compounds in such a slag is:

| | |
|---|---|
| CaO | 20%–60% |
| $SiO_2$ | 14%–22% |
| $Fe_2O_3$ | 10%–60% |

These slags are tapped from the furnace in which the steel is produced and are presently discarded onto waste dumps as no particular use has been found for them to date. The main problem with these slags is that they are volumetrically unstable and either break up into very fine powders (falling slags) or into small particles. Some steel slags can be used as aggregates in concrete, but the quantities thus utilised are small in comparison with the total quantity of slags produced. Further, these slag heaps are environmentally unacceptable.

These slags contain calcium oxide and silica in quantities which makes them potentially suitable for the manufacture of Portland cement. However, the iron content is too high for the slag to be used in reasonable quantities in the manufacture of such a cement.

The problem of high iron contents in Portland cement is that during the clinker burning process it causes severe coating problems and could cause high free lime contents during the cooling of the clinker. Additionally di-calcium ferrites cause durability problems in concrete, due to continued expansion after the concrete has hardened.

It has been found that the iron in some of the slags, which in cement chemistry is customarily expressed as $Fe_2O_3$, is present in the form of fairly strongly magnetic and very weakly magnetic particles, the latter being in the form of di-calcium ferrite which is microscopically distributed throughout the slag. Thus if a very strong magnet is employed all of the slag reports to the magnetic poles and no separation of the iron compounds is possible.

The $Fe_2O_3$ content of this type of slag can in the first instance be reduced by subjecting the material to further magnetic treatment using a magnet of medium strength of about 30–100 Gauss. This removes the free iron compounds which are strongly magnetic.

In other slags, the iron is present also in the form of FeO which is evenly distributed throughout the slag. No separation is possible by magnetic treatment of this type of slag.

In French Patent No 73.05145 a method is described in which bauxite and carbon are added to molten slag at a temperature of about 1 700° C. The carbon is clearly added to reduce the iron to the metallic form. Apart from the high energy requirements, this method appears to have practical problems since the mixing of a liquid at 1 700° C. with cold solids on an industrial scale may be very difficult.

Netherlands Patent No 7712077 describes the processing of LD slag from an oxysteel production process which is carried out by (a) heating a mixture of the slag, carbon and an $Al_2)_3$ and $SiO_2$ containing flux, to a temperature above 1 350° C. and up to 1 400° C. to reduce the metal oxides in the slag, and (b) cooling the mixture to 200° C. and separating iron from the resulting fine powder. The amount of flux added in such that the $CaO/Al_2O_3/SiO_2$ composition in weight percent falls within a zone in the phase diagram at 1 350° C. defined by the points (1) 55/3/42, (2) 60/28/12, (3) 70/4/26.

On cooling, the mixture disintegrated spontaneously into fine slag particles and relatively coarse iron particles which are separated by magnetic separation or air sifting. The residual slag particles may be reacted with lime to produce Portland cement. The process is carried out in a rotary kiln. This process suffers from the disadvantages that it requires a significant energy input and that it may be impractical to carry out the process in a rotary kiln because of the formation of low melting point compounds which would give rise to build-up problems.

SUMMARY OF THE INVENTION

According to the invention, a method of reducing the iron content of a starting material containing calcium, silicon and oxygen, and iron in the form of a ferrite and/or an oxide, includes the steps of:

(i) heating the starting material to a temperature of at least 800° C. in the presence of a reductant and in the presence of a siliceous material with which non-ferrous oxides released during the reduction form high melting point compounds, to produce a magnetic form of iron; and (ii) removing at least some of the magnetic form of iron to produce a product.

The method is preferably carried out in a cyclone type suspension type heat exchanger which may be fitted with a fluidised bed type furnace, if necessary.

The method of the invention preferably results in a product being produced with a content of iron calculated as $Fe_2O_3$ of 6% by weight or less.

BRIEF DESCRIPTION OF THE DRAWING

FIG. 1 is a schematic view of a cyclone type suspension heat exchanger for use in the method of the invention.

DESCRIPTION OF EMBODIMENTS

The starting material contains calcium, silicon and oxygen in addition to iron. The starting material will generally be a slag of the type described above.

The starting material is heated to a temperature of at lest 800° C., preferably between 900° C. and 1150° C. inclusive, and more preferably between 990° C. and 1 050° C. inclusive, in the presence of a reductant and a siliceous material. The optimum temperature will vary according to the nature of the slag.

Examples of suitable reductants are carbon which may be in the form of finely ground charcoal, sawdust, coal, oil burnt under air starvation conditions, and natural or synthetic gases also burnt under air starvation conditions, particularly carbon monoxide.

The method of the invention should be carried out in the absence of any free oxygen since it appears that at elevated temperatures the reduced iron is highly reactive.

The reductant may be a single reductant or may be a combination of two or more reductants. A preferred reductant is a combination of a gaseous and a solid reductant.

The siliceous material used must be a material with which non-ferrous oxides released during the reduction form high melting point compounds, i.e. a compound with a melting point greater than 1 150° C. The non-ferrous oxides include, in particular, calcium oxide. Certain siliceous materials do not form a high melting point compound with the CaO released, e.g. glass, and do not form part of the invention. The amount of the siliceous material to be added may vary but is generally within the range of from 0.5% to 5% by weight of the starting material.

Suitable siliceous materials are sodium silicate and silicas, i.e. silicon oxides, such as silica fume, diatomaceous earth and silica flour. For example, it has been found that amounts of 1% of silica fume or diatomaceous earth, or 2 to 3% of silica flour are effective to achieve the result desired.

The method of the invention is carried out in the absence of any aluminium compounds which are not an integral part of the starting material to prevent "stickiness" or soft agglomerates of the particles being produced.

The heat treatment of the starting material causes the ferrite to break up into an oxide and a magnetic form of iron. Such magnetic form may be metallic iron or an iron compound, particularly one which will react to a medium strong magnet, or a mixture thereof. For example, if the ferrite is calcium ferrite, it will break up on heat treatment into calcium oxide and a magnetic form of iron. Likewise the FeO will be reduced to Fe.

The iron or iron compounds may be removed from the material by methods known in the art, such as air separation, magnetic separation or methods employing differences in specific gravity, i.e. specific gravity separation. The preferred method of separation is magnetic separation.

The iron content of the final product, calculated as $Fe_2O_3$, is preferably reduced to 6% or less. This is to be compared with the iron content of the starting material, calculated as $Fe_2O_3$, which is generally 10% or greater.

The method of the invention is preferably carried out in a cyclone type suspension heat exchanger.

The method of the invention, carried out in a cyclone type suspension heat exchanger will now be described in more detail with reference to FIG. 1.

The cyclone type suspension heat exchanger comprises four pre-heaters 10, 12, 14, 16 arranged in series and connected to a holding vessel or fluidised bed type furnace 18. The top pre-heater 10 is also connected to another cyclone 20 and a bag filter 22.

The method of the invention, carried out in this cyclone type suspension heat exchanger will now be described. A mixture of slag, siliceous material and solid reductant is introduced into an inlet 23 at the top of the top pre-heater 10. Hot gases coming up via a line 24 from the next pre-heater 12 sweep the particles into the cyclone 10 where centrifugal forces separate the solids from the gas. In this process heat is transferred from the gas into the solid. This heat is used to dry the solids and to raise the temperature thereof. The solid particles fall to the bottom of the pre-heater 10 and are transferred via lines 26, 28 back to the second pre-heater 12.

The second pre-heater 12 is fed with hot gases from the third pre-heater 14 via lines 28, 30 and the procedure as carried out in the first pre-heater 10 is repeated. Solid particles are removed from the second pre-heater 12 via lines 32, 34 to the third pre-heater 14. Similarly, the third pre-heater 14 receives hot gases via lines 36, 34 from the fourth pre-heater 16 while solid particles from the third pre-heater 14 are delivered to the fourth pre-heater 16 via lines 38, 40. Most of the reduction takes place in the fourth pre-heater 16.

At the inlet to the fourth pre-heater 16, fuel is burnt under strongly reducing conditions and is introduced via lines 42, 40 into the fourth pre-heater 16.

The solid material from the fourth pre-heater 16 drops via a line 44 into the holding vessel or fluidised bed type furnace 18. Fuel and recycled gases are introduced into the holding vessel 18 via the line 45 and the lines 46, 48, 50 respectively to maintain the required holding temperature. This fuel is also burnt under oxygen starvation conditions.

The reduced slag is removed from the vessel 18 via a triple flap valve 52 and an air slide 54.

The gases which leave the first pre-heater 10 are sent via lines 56, 58, 60, 62 partially to a cyclone 20 where solid particles are removed and recycled via a line 64 to the second pre-heater 12, and partially to a bag filter 22. Cooling air may be introduced via a line 68. Again, solid particles from the bag filter 22 are recycled via the line 64 to the first pre-heater 10. Clean gases from the cyclone 20 are recycled via the lines 46, 48, 50 to the holding vessel 18. Cleaned gases from the bag filter 22 are released via a line 66 to the atmosphere.

A major advantage of the use of a cyclone type suspension heat exchanger is that this equipment is standard equipment in the cement industry and, apart from one or more gas handling fans, has no moving parts.

An experiment illustrating the method of the invention will now be given.

Finely divided slag from a steel manufacturing process, either ground or obtained directly from a dump, was mixed with carbon and silica fume in the following proportions:

| | | |
|---|---|---|
| slag | 94% | |
| fume | 1% | |
| carbon | 5% | which represents a large excess of that required. |

The mixture was dried at a temperature of 500° C. A magnesite crucible was heated to 1 000° C. and the mixture was introduced. The temperature dropped to about 600° C. The mixture was heated to 990° C. in an atmosphere of 15% CO, 85% $N_2$ by volume. To imitate conditions in a preheater of a cyclone type suspension heat exchanger, the CO content was then increased to 60% and the material kept at 1000° C. for two minutes. An XRD trace of the final product showed the presence of metallic Fe only, which was removed magnetically.

The material produced by the method of the invention may be mixed with other materials to produce a blend suitable for burning to a normal Portland cement. The blend will typically contain 80% slag (as treated above), 10% calcareous material and 10% agrillaceous material.

The iron particles may be returned to the steel manufacturing process.

The advantages of the method of the invention, particularly when carried out in a cyclone type suspension heat exchanger, are the low cost of the method relative to other potential methods and the fact that the method utilises a waste material.

What is claimed is:

1. A method of reducing the iron content of a steel slag starting material that contains calcium, silicon, and oxygen and iron in the form of at least one of a ferrite and an oxide, which includes the steps of:

(i) heating the starting material in finely divided form together with a reductant and a siliceous material, which forms high melting point compounds with non-ferrous oxides released during the reduction, by means of a cyclone suspension heat exchanger to a temperature from 800° C. to 1050° C. to form a magnetic form of iron; and (ii) removing at least some of the magnetic form of iron.

2. The method of claim 1 wherein the heat exchanger is used together with a fluidized bed furnace.

3. A method according to claim 1 wherein the material resulting from step (ii) has a content of iron calculated as $Fe_2O_3$ of 6% by weight or less.

4. A method according to claim 1 wherein in step (i) the starting material is heated to a temperature between 900° C. and 1050° C. inclusive.

5. A method according to claim 1 wherein in step (i) the starting material is heated to a temperature of between 990° C. and 1050° C. inclusive.

6. A method according to claim 1 wherein the reductant is selected from the group consisting of carbon, burnt under air starvation conditions, and natural or synthetic gases burnt under air starvation conditions.

7. A method according to claim 6 wherein the reductant is carbon monoxide burnt under air starvation conditions.

8. A method to claim 6 wherein the reductant is a combination of a gaseous and a solid reductant.

9. A method according to claim 1 wherein the siliceous material is a silicon dioxide.

10. A method according to claim 9 wherein the silicon dioxide is selected from the group consisting of silica fume, diatomaceous earth and silica flour.

11. A method according to claim 1 wherein the amount of the siliceous material added in step (i) is from 0.5% to 5% inclusive be weight of the starting material.

12. A method according to claim 1 wherein in step (ii) the magnetic form of iron is removed by a method selected from the group consisting of air separation, magnetic separation and specific gravity separation.

13. A method according to claim 12 wherein in step (ii) the magnetic form of iron is removed by magnetic separation.

14. A method according to claim 1 wherein the starting material is free of any aluminum compounds.

* * * * *